United States Patent [19]
Leistner et al.

[11] Patent Number: 6,129,493
[45] Date of Patent: Oct. 10, 2000

[54] TEE-NUT WITH GLOBULAR SHAPED SLEEVE

[75] Inventors: Herbert E. Leistner, Toronto; Paul D. Green, Scarborough; Richard J. Pfeiffer, West Hill, all of Canada

[73] Assignee: Sigma Tool & Machine, Toronto, Canada

[21] Appl. No.: 09/427,293

[22] Filed: Oct. 26, 1999

[51] Int. Cl.⁷ ...................................................... F16B 37/04
[52] U.S. Cl. ............................ 411/183; 411/179; 411/427
[58] Field of Search .................................... 411/173, 177, 411/179, 180, 181, 183, 187, 427

[56] References Cited

U.S. PATENT DOCUMENTS

| | | |
|---|---|---|
| 2,259,720 | 10/1941 | Amesbury . |
| 2,818,901 | 1/1958 | Becker . |
| 3,193,921 | 7/1965 | Kahn . |
| 5,348,432 | 9/1994 | Magayama . |
| 5,618,144 | 4/1997 | Leistner . |
| 5,863,164 | 1/1999 | Leistner . |

*Primary Examiner*—Flemming Saether
*Attorney, Agent, or Firm*—Ohlandt, Greeley, Ruggiero & Perle, LLP

[57] ABSTRACT

A Tee-nut having a flange head, a plurality of prongs extending from the flange head, and a hollow sleeve extending from the flange head. The hollow sleeve has an internally threaded reduced diameter waist portion connecting to the flange head, and an enlarged globular bulbous portion extending from the internally threaded waist portion. The end of the enlarged bulbous portion is radiussed inwardly to facilitate insertion into a hole in a workpiece. Also disclosed is a workpiece fitted with such a Tee-nut.

8 Claims, 2 Drawing Sheets

TEE-NUT WITH GLOBULAR SHAPED SLEEVE

FIELD OF THE INVENTION

The present invention relates to a Tee-nut and, in particular, to a Tee-nut having a sleeve which shaped with a globular shape for ease of insertion and for enhanced retention.

BACKGROUND OF THE INVENTION

Fastener members, having a flange portion and a hollow sleeve portion with a flarable end, are known and are commonly referred as Tee-nuts, or rivet type Tee-nuts. Other Tee nuts are available in which the Tee nut is simply inserted into a workpiece and is retained therein by spikes formed around the flange. In this specification, the term "Tee-nut" is used to describe such fastener members, whether of the flarable type or the simple sleeve type.

Such Tee-nuts are usually formed of sheet metal, and provide a flange portion with a plurality of fastening teeth or prongs, and a threaded sleeve, all formed out of a single piece of sheet metal.

Typically such Tee-nuts are used, for example, in furniture frames, for fastening the components of the furniture together. They also have a variety of other uses, both in furniture and in many other industries.

U.S. Pat. No. 5,348,432 granted to Nagayama on Sep. 20, 1994 discloses a Tee-nut having a sleeve in the form of a hollow cylinder with a relatively thin-walled counterbored flarable end portion and a relatively thicker-walled threaded portion. The thin-walled flarable hollow sleeve end is formed by counter boring an internally threaded hollow sleeve. When flared outwardly, the thin-walled flarable counter-bored end has a tendency to split, and the thin walled portion has a tendency to collect wood chips internally in the threads, as the Tee nut is driven in to the work piece.

U.S. Pat. No. 5,618,144, inventor Volkmar W. Leistner, title Tee-nut with Enlarged Sleeve End, granted Apr. 8, 1997 and assigned to Sigma Tool & Machine a Partnership of Sigma Tool & Machine Limited and Sigma Fasteners Limited shows an improved form of Tee-nut with a flarable end. In this patent the Tee-nut sleeve is swaged out to enlarge its diameter, without intermediate reverse forming operations. However, these Tee-nuts require to be inserted into and through a bore in a wooden workpiece. The enlarged flarable leading end which was inserted first into the bore tended in some cases, since the leading end of the open bore tended to catch on the wood or tear particles of wood away. However these problems were unusual since the holes in the workpiece were larger than the sleeve diameter, so as to admit the enlarged swaged out leading end. Enlarging the diameter of the hole meant that the Tee nut sleeve must be securely flared so as to make a firm fit in the hole.

A further factor in the consideration of the manufacture of Tee nuts is that where the Tee nuts are intended to be used without flaring, it has been the practice to supply a simple Tee nut with a cylindrical sleeve, and where it was intended to flare the Tee nut then a special Tee nut of flarable design was provided instead. This may involve the user in buying and storing two different types of Tee nuts, depending upon which Tee nut was to be used. Clearly it is desirable to provide a Tee nut which is adaptable to both types of installation, if it should become necessary to use a non-flaring Tee nut in place of a flaring Tee nut, and vice versa.

It is further desirable to provide a flarable Tee nut which does not require the drilling of an oversize hole, so that a greater thickness of workpiece material is left around the hole for reception of the prongs.

Conversely it is desirable to provide a Tee nut which has a capacity for insertion into a regular sized hole in a workpiece, and when inserted, producing a greater holding power than with conventional Tee nuts with regular cylindrical shaped sleeves.

BRIEF SUMMARY OF THE INVENTION

The present invention provides a Tee-nut comprising a flange head member, a plurality of prongs extending from said flange head member, and a sleeve member extending from said flange head member, said sleeve member being in the form of a hollow cylindrical sleeve comprising a sleeve waist portion provided at the end of said sleeve member connecting to said flange head member, which is internally threaded and defines a cylindrical portion, an enlarged generally globular bulbous portion extending from said internally threaded portion, wherein the outer globular surface of said bulbous portion has a larger diameter than the outer diameter of said internally threaded cylindrical portion, and wherein the exterior surface of said globular bulbous portion defines a smooth, curved shape in elevation, tapering outwardly from said waist to a maximum diameter around said globular bulbous portion, and tapering inwardly once more to the free end of said sleeve.

The invention further provides a flarable Tee nut having these features and wherein the interior diameter of said enlarged globular bulbous portion is unthreaded and is flarable.

The invention further provides such a Tee nut wherein the open end of the globular bulbous portion is larger than the inner diameter of said internally threaded cylindrical waist portion such that a threading tool is adapted to pass through said globular flarable portion and operable to internally thread the interior of said waist portion of said sleeve member forming said internally threaded portion and wherein the end of said globular bulbous flarable portion is radiussed inwardly.

The invention is used in workpieces having holes which are generally minimally oversized relative to the waist diameter of the Tee-nut. This provides added holding power in the workpiece due to the reduced radius in the region of the waist which allows workpiece material to contract around waist portion after the globular bulbous portion is inserted, to thus swell again around the waist portion, thereby gripping the globular bulbous portion and holding the Tee nut securely in place.

Because the flarable portion is globular in shape it slides more easily into the workpiece hole and does not pick up wood chips.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

DESCRIPTION OF A SPECIFIC EMBODIMENT

Figure 1:
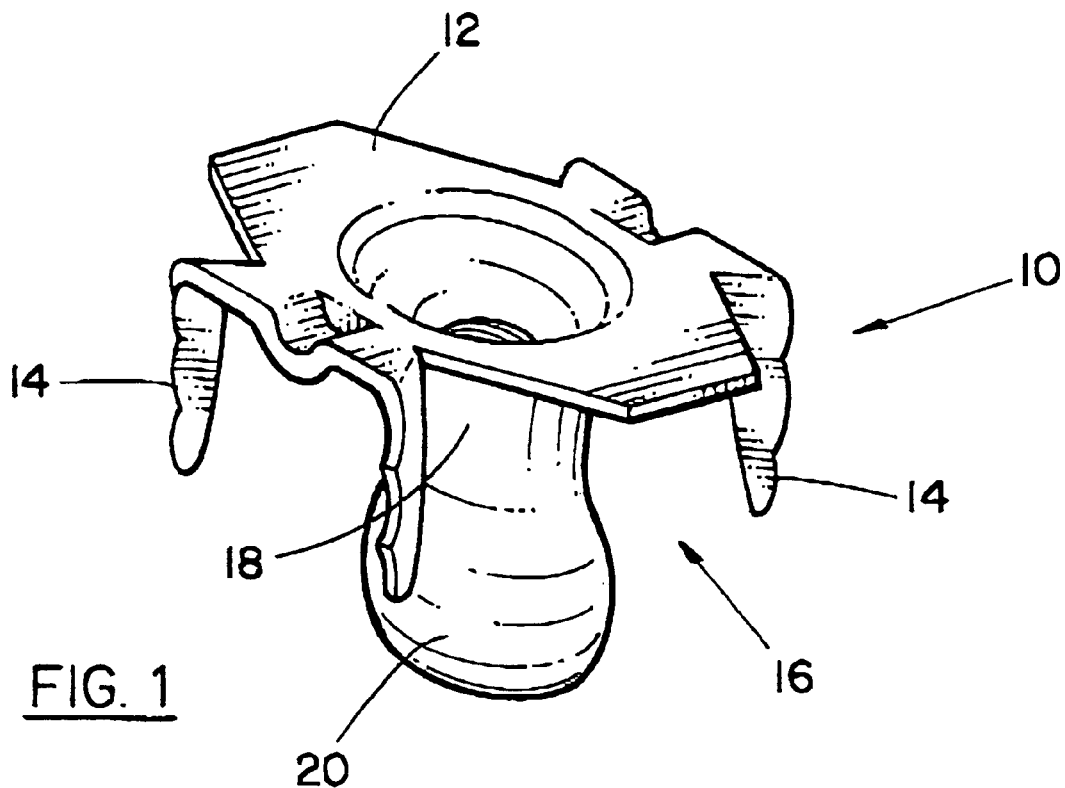
FIG. 1 is a perspective view of a Tee-nut illustrating an embodiment of the present invention.
Figure 2:
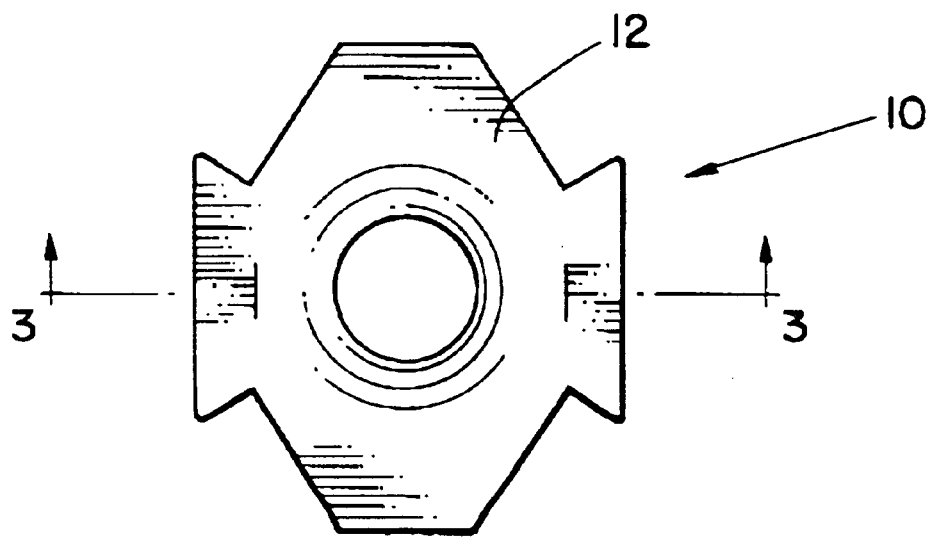
FIG. 2 is a top plan view of the Tee-nut of FIG. 1.

FIGS. 1 and 2 show a Tee-nut illustrating an embodiment of the present invention.

The Tee-nut, generally indicated by reference numeral 10, comprises an octagon-shaped flange head 12, four integral prongs 14—14 extending from the flange head 12, and an integral hollow sleeve 16 extending perpendicular from the flange head 12.

The sleeve 16 comprises an internal threaded waist portion 18 and an enlarged globular bulbous portion 20.

The sleeve 16 from flange 12 to waist portion 18, defines a sleeve junction shaped as a progressively reducing radiussed portion, defining an arc.

The waist portion 18, has internal threads 22, in which a co-operating threaded screw member (not shown) is received. From portion 18 to the enlarged globular bulbous portion 20 is formed as a progressively expanding radius defining an a smooth curve, in profile.

The outer shape of the enlarged globular bulbous portion 20 is of larger diameter than the outer diameter of the internally threaded portion 18. The inner diameter of the enlarged globular bulbous portion 20 is larger than the inner diameter of the internally threaded portion 18 such that a threading tool is enabled to pass through the enlarged globular bulbous portion 20, for internally threading waist 18 of the sleeve 16 thus forming the internally threaded portion 18.

An inwardly radiussed leading end portion 24 is formed at the end of the enlarged globular bulbous portion 20. The radiussed leading end portion 24 is formed by turning the outer end of globular bulbous portion 20 inwardly by a suitable tool.

It will be seen that the exterior profile of the sleeve 16 is more or less that of a reduced diameter stem or waist with a globe-shaped end. The first portion of the sleeve 16 adjacent to the flange has a wider diameter, which progressively reduces towards the waist portion 18. The sleeve 16 is more or less cylindrical in the region of the interior threads at 18. The sleeve 16 then expands outwardly towards the maximum diameter of the globular bulbous portion 24, after which it curves progressively inwardly at the leading end portion 20. Thus, the globular bulbous portion is somewhat in the form of a partial sphere or globe, with the sleeve 16, in the region of the waist portion 18 defining a continuously convex arc in profile, so that the exterior shape of the Tee-nut makes a smooth transition from concave to convex.

Figure 3:
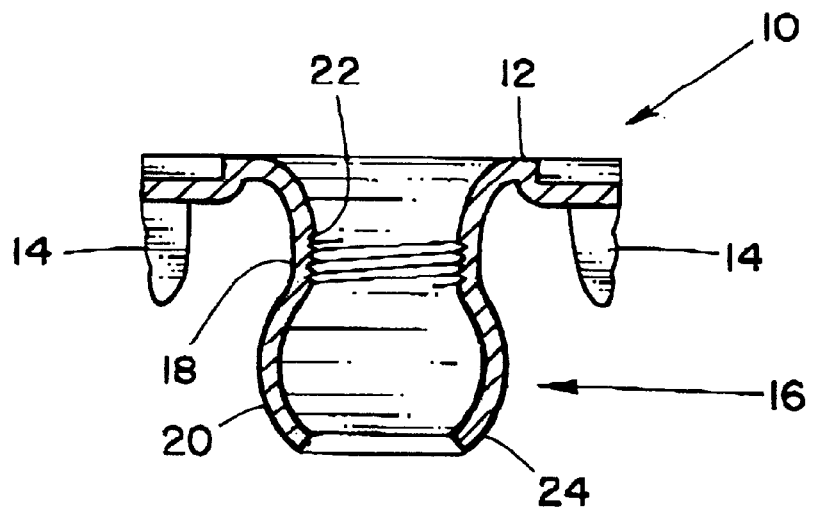
FIG. 3 is a sectional view taken along line 3—3 in FIG. 2.
Figure 4:
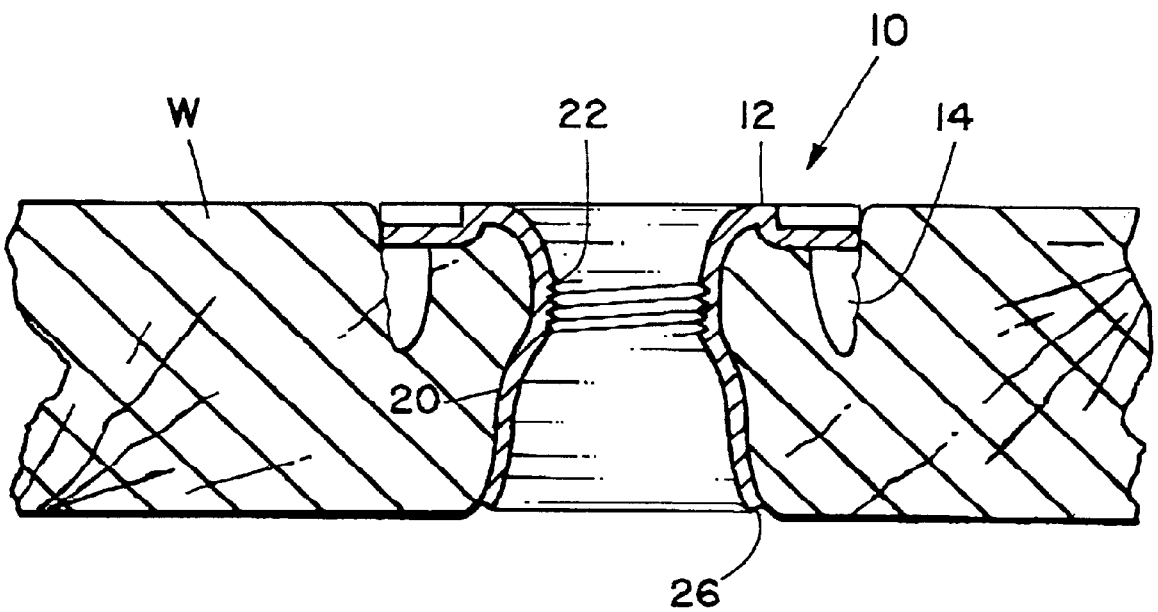
FIG. 4 is a section corresponding to FIG. 3 showing the Tee-nut completely inserted, and flared out.

FIG. 3 shows a Tee-nut 10 after having been inserted into a pre-drilled hole 30 of a workpiece W, such as a piece of wood, or a panel of chipboard, or other composite material. The diameter of the through hole 30 is smaller than the outer diameter of the enlarged globular bulbous portion 20 of the Tee-nut 10. During the insertion process, the inwardly raidussed leading end 24 has forced or wedged its way through the hole 30, causing temporary displacement of part of the workpiece around the hole 30. As the waist portion 18 is finally seated in the hole 30, these displaced portions of the workpiece will resume their normal shape, and will snuggly engage the waist 18. In this way, the globular bulbous portion 20 is wedge fitted into the hole in the workpiece. At the same time, the Tee-nut is more securely located and held in position.

The prongs 14—14 penetrate the workpiece W, around the hole 30. Since the hole 30 is of a smaller diameter to begin with, there will be a greater thickness of the workpiece around the hole 30 to receive the prongs 14. The prongs 14 thus prevent rotation of the Tee-nut 10 when a threaded screw member is being threadingly engaged to the internal threaded portion 18.

The enlarged globular portion 20 is then flared out by means of a conventional flaring tool (not shown) in the hole 30, forming a trumpet-shaped flared end 26. The flared end 26 securely holds the Tee-nut 10 within the pre-drilled through hole 30 of the workpiece 10 and prevents the Tee-nut 10 from being withdrawn or pulled out from the workpiece W.

It will of course be understood that while what is explained here is the use of a rivet type Tee-nut, that the Tee-nut in accordance with the present invention may also be applicable to applications where it is simply inserted into a workpiece without any rivet or flaring action, if it should be desired to use this type of Tee-nut in such an application.

The foregoing is a description of a preferred embodiment of the invention which is given here by way of example only. The invention is not to be taken as limited to any of the specific features as described, but comprehends all such variations thereof as come within the scope of the appended claims.

The embodiments of the invention in which an exclusive property or privilege is claimed are defined as follows:

1. A Tee-nut for insertion into a hole in a workpiece, the hole having a predetermined diameter, said Tee-nut having:
    a flange head member;
    a plurality of prongs extending from said flange head member;
    a hollow sleeve member extending from said flange head member; said hollow sleeve member, comprising:
        a junction portion adjacent said flange head member;
        an internally threaded sleeve waist portion connecting to said junction portion;
        an enlarged globular bulbous semi-spherical sleeve portion extending from said internally threaded waist portion, wherein the maximum outer diameter of said enlarged flarable bulbous portion is larger than the outer diameter of said internally threaded waist portion, and wherein the exterior profile of said enlarged globular bulbous portion defines a continuous smoothly curved arc going from a minimum diameter at the waist portion to a larger diameter at the largest region of said globular bulbous portion, and,
        an inwardly radiussed end on said enlarged globular bulbous flarable portion.

2. A Tee-nut as claimed in claim 1 further comprising:
    wherein the said junction portion is formed in a progressively reducing radiussed fashion defining an arc.

3. A Tee-nut as claimed in claim 1 including:
    an opening defined in said inwardly radiussed end, said opening defining a diameter larger than the interior diameter of said internally threaded sleeve waist portion.

4. A wooden workpiece having at least one Tee-nut embedded therein and comprising;
    at least one hole extending through said workpiece said hole having a predetermined diameter;

a Tee-nut located in said hole and having a flange member;

a plurality of prongs extending from said flange member, and embedded into said workpiece;

a hollow sleeve member extending from said flange head member; said hollow sleeve member, comprising:

a junction portion adjacent said flange head member;

an internally threaded sleeve waist portion connecting to said junction portion;

an enlarged globular bulbous semi-spherical sleeve portion extending from said internally threaded waist portion, wherein the maximum outer diameter of said enlarged flarable bulbous portion is larger than the outer diameter of said internally threaded waist portion, and wherein the exterior profile of said enlarged globular bulbous portion defines a continuous smoothly curved arc going from a minimum diameter at the waist portion to a larger diameter at the largest region of said globular bulbous portion, and, an inwardly radiussed end on said enlarged globular bulbous flarable portion.

5. A wooden workpiece as claimed in claim 4 wherein said hole in said workpiece has a diameter less than that of said enlarged bulbous sleeve portion.

6. A wooden workpiece as claimed in claim 5 wherein said free end of said enlarged sleeve portion is swaged outwardly thereby securing said Tee-nut in said hole in said workpiece.

7. A Tee-nut as claimed in claim 4 further comprising:

wherein the said junction portion is formed in a progressively reducing radiussed fashion defining an arc.

8. A Tee-nut as claimed in claim 4 including:

an opening defined in said inwardly radiussed end, said opening defining a diameter larger than the interior diameter of said internally threaded sleeve waist portion.

\* \* \* \* \*